United States Patent
Horling et al.

(10) Patent No.: US 10,484,319 B1
(45) Date of Patent: Nov. 19, 2019

(54) DATE AND/OR TIME RESOLUTION

(71) Applicant: Google LLC, Mountain View, CA (US)

(72) Inventors: Bryan Christopher Horling, Sunnyvale, CA (US); Ashutosh Shukla, Mountain View, CA (US); Antoine Jean Bruguier, Milpitas, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/360,903

(22) Filed: Mar. 21, 2019

Related U.S. Application Data

(63) Continuation of application No. 14/316,604, filed on Jun. 26, 2014, now Pat. No. 10,277,543.

(51) Int. Cl.
*G06F 15/16* (2006.01)
*H04L 12/58* (2006.01)

(52) U.S. Cl.
CPC .................... *H04L 51/08* (2013.01)

(58) Field of Classification Search
CPC ........................................................ H04L 51/08
USPC ........................................................ 709/206
See application file for complete search history.

(56) References Cited

U.S. PATENT DOCUMENTS

| | | |
|---|---|---|
| 6,240,546 B1 | 5/2001 | Lee et al. |
| 2004/0123240 A1 | 6/2004 | Gerstl et al. |
| 2007/0073810 A1 | 3/2007 | Adams et al. |
| 2007/0150513 A1 | 6/2007 | Vanden Heuvel et al. |
| 2007/0244976 A1 | 10/2007 | Carroll et al. |
| 2008/0154897 A1 | 6/2008 | Meliha et al. |
| 2008/0208864 A1 | 8/2008 | Cucerzan et al. |
| 2009/0076799 A1 | 3/2009 | Crouch et al. |

*Primary Examiner* — Normin Abedin
(74) *Attorney, Agent, or Firm* — Middleton Reutlinger

(57) ABSTRACT

Methods and apparatus are disclosed for resolving multiple interpretations of an ambiguous temporal term of a resource to a subset of the multiple interpretations. In some implementations, a group of one or more messages is identified, an ambiguous temporal term of the messages determined, additional content of the messages determined, and multiple interpretations of the ambiguous temporal term resolved to a subset based on the additional content.

15 Claims, 5 Drawing Sheets

108A

108A1 | From: Bob (123)456-7891
We're having dinner at Pat's Steakhouse on 6/26/14 at 7:00.

- Teleconference

158B1
To: jim@exampleurl.com (Jim)
From: joe@exampleurl.com (Joe)
CC: bob@exampleurl.com (Bob)
Sent: Monday, January 7, 1985, 10:30 AM Jim, 10:00 next Tuesday is a good time for us.

158B2
To: joe@exampleurl.com (Joe), bob@exampleurl.com (Bob)
From: jim@exampleurl.com (Jim)
Sent: Monday, January 7, 1985, 8:00 AM Joe and Bob, I'd like to schedule a teleconference one morning to discuss the flux capacitor project. Let me know what date/time works.

Jim

108B1
From: Bob
To: Joe, Jim

I need to push the teleconference back to 11:00 – stuck in another meeting.

FIG. 5

DATE AND/OR TIME RESOLUTION

BACKGROUND

Users may be inundated with emails, texts, voicemails, and/or other resources that are related to events, that ask the users to perform tasks, etc. Many of those resources may contain temporal terms that indicate a date and/or time such as "7:00", "Wednesday", "6/26", "next Wednesday", or "next week". Some temporal terms of resources may be open to multiple interpretations. For example, a temporal term of "7:00" may be open to multiple interpretations such as 7:00 AM, 7:00 PM, 7:00 Pacific Time, 7:00 Eastern Time, etc. Also, for example, a temporal term of "next Sunday" may be open to multiple interpretations such as the nearest in future Sunday, or the Sunday following the nearest in future Sunday.

SUMMARY

This specification is directed generally to methods and apparatus for resolving multiple interpretations of an ambiguous temporal term of a resource to a subset (e.g., a single) of the multiple interpretations. For example, a resource may include the sentence "Let's meet on 6/26 at 7:00." The temporal term "7:00" of the sentence is open to multiple interpretations such as such as 7:00 AM, 7:00 PM, 7:00 AM/PM Pacific Time, 7:00 AM/PM Eastern Time, etc. Methods and apparatus described herein may be utilized to resolve "7:00" to a subset of the multiple interpretations, such as resolution of "7:00" to "7:00 PM Pacific Time".

Some implementations use additional content of the resource, and/or additional content of an additional resource associated with the resource, to resolve the multiple interpretations to the subset. For example, where the resource is a message sent or received by the user (e.g., an email, a text message, a social networking message, a voicemail, and/or a social networking message), additional content of the message may be utilized to resolve the multiple interpretations to the subset. For instance, an association of the additional content to the subset may be utilized to resolve the multiple interpretations to the subset. Also, for example, where the resource is a message sent or received by the user, additional content of related messages may be utilized to resolve the multiple interpretations to the subset. Related messages of a message may include, for example, messages that are in the same thread (e.g., replies) as the message and/or messages that are otherwise determined to be related to the message (e.g., based on similar subjects, similar content, similar parties included in the messages). The resolved subset of the multiple interpretations may be utilized, for example, to provide an indication of the subset to the user via a computing device and/or to create a calendar or other scheduling entry that includes the subset and optionally other associated content.

In some implementations, a computer implemented method may be provided that includes the steps of: identifying a group of one or more messages sent or received by a user, each of the messages including content that includes one or more terms; determining an ambiguous temporal term of the terms of the messages of the group, the ambiguous temporal term open to multiple interpretations; determining additional content of the content of the messages of the group, the additional content in addition to the ambiguous temporal term; and resolving the multiple interpretations to a subset based on the additional content.

This method and other implementations of technology disclosed herein may each optionally include one or more of the following features.

In some implementations, determining the ambiguous temporal term includes identifying the ambiguous temporal term from the terms of a given message of the messages of the group and determining the additional content includes identifying the additional content from the content of an additional message of the messages of the group. In some of those implementations, determining the group includes determining one or more associations between the messages of the group. In some of those implementations, the given message is first type of message and the additional message is a second type of message distinct from the first type of message. In some of those implementations, determining the one or more associations includes identifying the given message and the additional message are part of the same message thread. In some of those implementations, the additional content is an additional term of the terms of the additional message and resolving the multiple interpretations to a subset based on the additional content includes determining the subset based on an association of the additional term to the subset. In some of those implementations, the additional content is an additional temporal term of the terms of the additional message. In some of those implementations, the association of the additional content to the subset is at least one of: an association to a time zone, an association to a time period, an association to one or more dates, an association to a location, and an association to a language. In some of those implementations, the additional content is a reference to a non-temporal entity. In some of those implementations, the association of the additional content to the subset is an association of a class of the non-temporal entity to the subset. In some of those implementations, the association of the additional content to the subset is at least one of: an association to a time zone, an association to a time period, an association to one or more times, and an association to one or more dates.

In some implementations, the additional content is from a given message of the messages of the group and includes at least one of: an indication of one or more senders of the given message, an indication of one or more recipients of the given message, a time the message was sent, and a date the message was sent.

In some implementations, resolving the multiple interpretations to a subset based on the additional content includes providing one or more features associated with the ambiguous temporal term and the additional content as input to a classifier and receiving, as output from the classifier, an indication of the subset.

In some implementations, resolving the multiple interpretations to a subset based on the additional content includes applying one or more rules based on one or more features associated with the ambiguous temporal term and the additional content.

In some implementations, the ambiguous temporal term and the additional content are both determined from a given message of the messages of the group and determining the additional content includes determining the additional content based on a syntactic relationship between the additional content and the ambiguous temporal term.

In some implementations, determining the additional content of the content of the messages of the group includes ignoring at least some of the additional content based on one or more rules.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 3 illustrates an example text message that includes an ambiguous temporal term.

FIG. 4 illustrates an example email message trail that includes a plurality of ambiguous temporal terms.

FIG. 5 illustrates an example text message that include an ambiguous temporal term and that is related to the example email message trail of FIG. 4.

DETAILED DESCRIPTION

Figure 1:
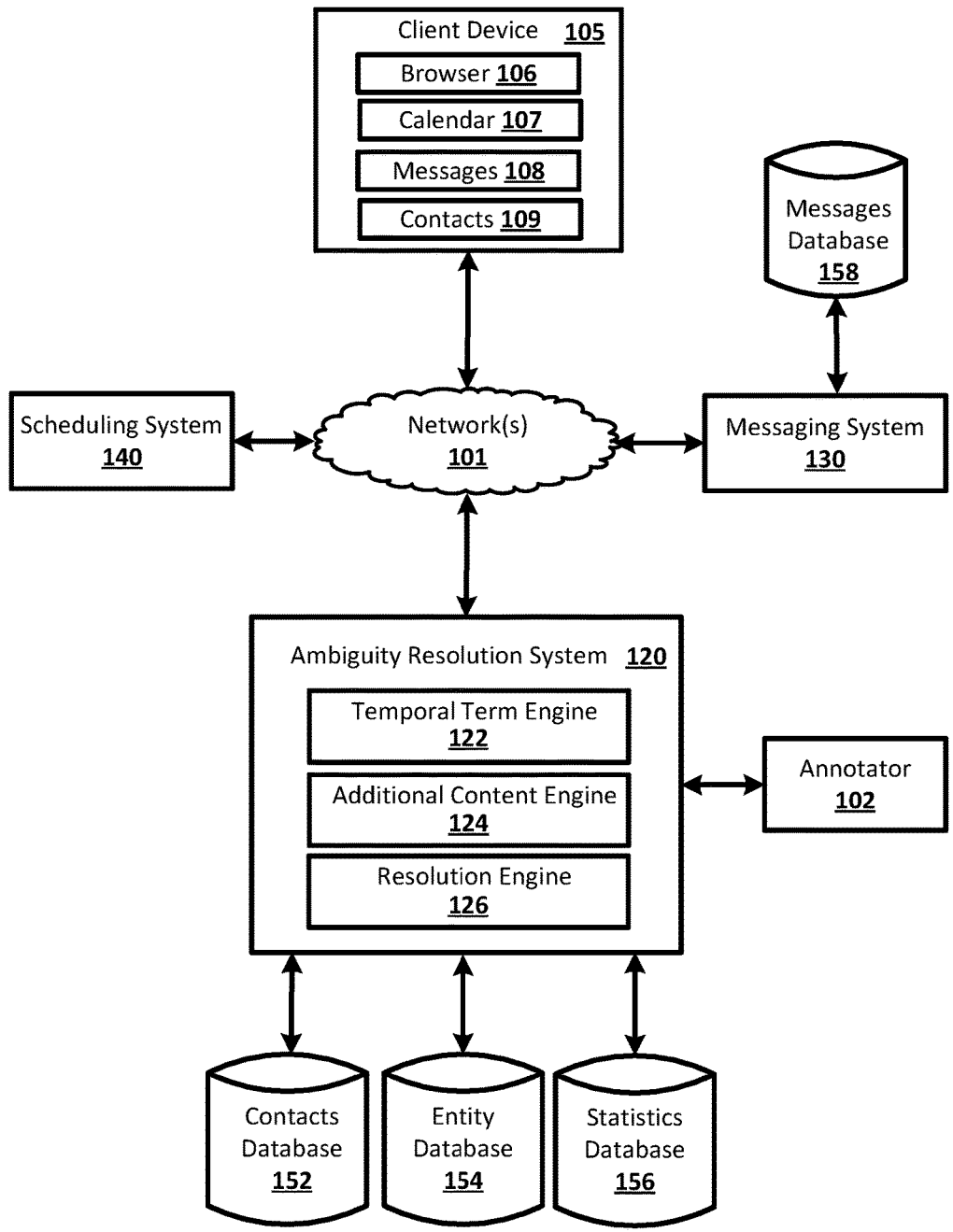
FIG. 1 illustrates an example environment in which multiple interpretations of an ambiguous temporal term of a resource may be resolved to a subset of the multiple interpretations.

FIG. 1 illustrates an example environment in which multiple interpretations of an ambiguous temporal term of a resource may be resolved to a subset of the multiple interpretations. The example environment includes a client device 105, an ambiguity resolution system 120, a messaging system 130, a scheduling system 140, and an annotator 102. Ambiguity resolution system 120 may be implemented in one or more computers that communicate, for example, through a network (not depicted). Ambiguity resolution system 120 is an example of a system in which the systems, components, and techniques described herein may be implemented and/or with which systems, components, and techniques described herein may interface.

Client device 105, ambiguity resolution system 120, messaging system 130, scheduling system 140, and annotator 102 each include one or more memories for storage of data and software applications, one or more processors for accessing data and executing applications, and other components that facilitate communication over a network. The operations performed by client device 105, ambiguity resolution system 120, messaging system 130, scheduling system 140, and/or annotator 102 may be distributed across multiple computer systems.

Client device 105 may be a computer coupled to the ambiguity resolution system 120, the messaging system 130, the scheduling system 140, and/or other component through one or more networks 101 such as a local area network (LAN) or wide area network (WAN) such as the Internet. The client device 105 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device). Additional and/or alternative client devices may be provided.

As described herein, in some implementations the ambiguity resolution system 120 may resolve ambiguous temporal terms in one or more resources that are created by the client device 105, sent from the client device 105, received at the client device 105, and/or are otherwise accessible via the client device. As used herein, resources may include, for example, one or more of: messages sent or received, such as emails, text messages, social networking communications (e.g., posts, tweets, private messages, chats); task entries; word processing documents; portable document format (PDF) documents; spreadsheets; webpages; and so forth. For example, in some implementations the ambiguity resolution system 120 may resolve ambiguous temporal terms in a message associated with a user of client device 105 that is sent from, received at, or otherwise accessible via client device 105.

As also described herein, in some implementations the ambiguity resolution system 120 and/or another component may provide an indication of the resolution of an ambiguous temporal term to the user via client device 105 and/or create a calendar or other scheduling entry (e.g., a reminder) that includes the resolution of the ambiguous temporal term, and that may be viewed by the user via client device 105. For example, in some implementations a resolution of an ambiguous temporal term of a message may be utilized to provide an indication of a clarification of the ambiguous temporal term in the message. For instance, an ambiguous temporal term of "7:00" in a message may be provided with an annotation of a "PM" time period and viewed by the user via client device 105. Also, for example, in some implementations a resolution of an ambiguous temporal term of a message may be utilized to automatically create a calendar entry that includes the resolution of the ambiguous temporal term. For instance, a resolution of the ambiguous temporal term "next Sunday" in a message to the nearest in future Sunday may be utilized to create a calendar entry for the nearest in future Sunday, and that optionally includes other content from the message.

Client device 105 may operate one or more applications and/or components such as those that facilitate user consumption and manipulation of resources such as messages, those that enable interaction with messaging system 130 and/or scheduling system 140, and/or those that facilitate provision of indications of resolutions of ambiguous temporal terms. These applications and/or components may include, but are not limited to, a browser application 106 a calendar application 107, a messages application 108, a user contacts application 109, and so forth. In some instances, one or more of these applications and/or components may be operated on multiple client devices operated by the user. In some implementations, one or more of the applications 106-109 may provide all or aspects of resources to one or more of ambiguity resolution system 120, messaging system 130, and/or scheduling system 140. For example, in some implementations messages application 108 maybe a text messaging application that provides text messages to ambiguity resolution system 120. For the sake of brevity, only a single client device 105 is illustrated in FIG. 1 and described in some examples herein. However, techniques described herein are applicable for multiple client devices. Moreover, although a user will likely operate a plurality of computing devices, and content may be provided to and/or received from multiple of the computing devices of the user, for the sake of brevity, certain examples described in this disclosure will focus on the user operating client device 105.

Generally, ambiguity resolution system 120 resolves multiple interpretations of an ambiguous temporal term of a resource to a subset (e.g., a single) of the multiple interpretations. In various implementations, ambiguity resolution system 120 may include a temporal term engine 122, an additional content engine 124, and a resolution engine 126. In some implementations, one or more of engines 122, 124, and/or 126 may be omitted. In some implementations, all or aspects of one or more of engines 122, 124, and/or 126 may be combined. In some implementations, one or more of engines 122, 124, and/or 126 may be implemented in a component that is separate from ambiguity resolution system 120. For example, in some implementations, one or more of engines 122, 124, and/or 126, or any operative portion thereof, may be implemented in a component that is executed by client device 105, scheduling system 140, or messaging system 130.

Generally, temporal term engine 122 determines ambiguous temporal terms of resources. As used herein, an ambiguous temporal term is a term that potentially indicates a date and/or a time, that is open to multiple interpretations, and that is not immediately preceded or followed by one or more terms that, standing alone, fully disambiguate the term. For example, a term of "7:00" in the sentence "Let's meet at 7:00." is an ambiguous temporal term as it is open to multiple interpretations such as such as 7:00 AM, 7:00 PM, 7:00 AM/PM Pacific Time, 7:00 AM/PM Eastern Time, etc. Also, for example, a term of "7" in the sentence "How about 7?" is an ambiguous temporal term as it is open to multiple interpretations such as the time "7:00" or the non-temporal indication of quantity. Also, for example, a term of "June 10" is an ambiguous temporal term as it is open to multiple interpretations such as the nearest in the future June 10$^{th}$ or another June 10$^{th}$ (e.g., a past June 10$^{th}$ or a June 10$^{th}$ after the nearest in future June 10$^{th}$). Also, for example, a term of "next Sunday" in the sentence "We're having a party next Sunday." is an ambiguous temporal term as it is open to multiple interpretations such as the nearest in future Sunday, or the Sunday following the nearest in future Sunday. Also, for example, "on Sunday" is an ambiguous temporal term as it is open to multiple interpretations such as a past Sunday or an upcoming Sunday. Also, for example, a term of "7:00 PM EST" in the phrase "Time: 7:00 PM EST" is not an ambiguous temporal term as its interpretation is clear from the term itself.

In some implementations, the temporal term engine 122 may determine an ambiguous temporal term based on regular expressions or other rules, heuristics, etc. For example, temporal term engine 122 may apply a rule that utilizes a regular expression such as the following: (Next|next) \s* (Sunday|sunday|Monday|Monday . . . . Saturday|Saturday) to identify ambiguous temporal terms such as "next Monday" or "Next tuesday". Also, for example, temporal term engine 122 may apply a rule that identifies any term of the format "[0-12]:00" that is not followed within a threshold distance by "AM, am, PM, pm, A.M., a.m., P.M., or p.m." to identify ambiguous temporal terms such as "7:00" or "10:00". In some implementations, the temporal term engine 122 may utilize one or more annotations provided from the annotator 102 to determine an ambiguous temporal term.

For example, as described herein, the annotator 102 may be configured to identify and annotate various types of grammatical information in one or more segments of text and the temporal term engine 122 may utilize such annotations in determining an ambiguous term. For instance, the annotations of a term may indicate its syntactic relationship to one or more other term(s) and the syntactic relationship may be utilized in determining the ambiguous term based on one or more rules.

Generally, additional content engine 124 determines additional content of resources that may be utilized to resolve multiple interpretations of ambiguous terms in the resources. As used herein, additional content of a resource includes for example, one or more terms of the resource, metadata of the resource, etc. For example, when the resource from which an ambiguous temporal term is determined is a message, additional content may include other terms of the message, metadata of the message (e.g., a time the message was sent, a sender and/or recipient of the message), other terms of related messages, and/or metadata of related messages. As one example of determining additional content, temporal term engine 122 may determine a term of "7:00" is an ambiguous temporal term in the sentence "Let's meet at 7:00." of a message. Additional content engine 124 may determine additional content in the message that may be utilized to resolve the multiple interpretations of "7:00". For example, additional content engine 124 may determine a reference to one or more non-temporal entities in the message that may be associated with a subset of the multiple interpretations, such as a reference to "dinner", which may be associated with a "PM" time period. Although AM/PM time periods are described in examples herein, additional and/or alternative time periods may be utilized (e.g., the four Thai time periods). As another example of determining additional content, temporal term engine 122 may determine a term of "tomorrow" is an ambiguous temporal term in the phrase "we'll discuss tomorrow" of a message sent at 6:00 AM GMT on a Sunday (e.g., it may mean Sunday in Seattle, but mean Monday in the United Kingdom). Additional content engine 124 may determine additional content in the message that may be utilized to resolve the multiple interpretations of "tomorrow". For example, additional content engine 124 may determine a reference to a time zone of the sender in the metadata of the message that may be associated with a subset of the multiple interpretations, such as a reference to "Pacific Time".

In some implementations, the additional content engine 124 may determine the additional content based on regular expressions or other rules, heuristics, etc. For example, additional content engine 124 may apply a rule that utilizes a regular expression such as the following: (Dinner|dinner|Supper|supper) to identify additional content that may indicate a "PM" activity time and that may be utilized to disambiguate an ambiguous time term that does not indicate a time period of AM or PM. Also, for example, additional content engine 124 may apply a rule that identifies any reference to a "location" entity (e.g., a restaurant, a venue, a store) as additional content that may be utilized to disambiguate an ambiguous time term that does not indicate a time period of AM or PM (e.g., based on a stronger association of the location entity to one of the time periods). In some implementations, the additional content engine 124 may utilize one or more annotations provided from the annotator 102 to determine additional content. For instance, the annotations of a term may indicate one or more entities associated with the term and the additional content engine 124 may identify the term as additional content based on the one or more associated entities.

In some implementations, the additional content determined by additional content engine 124 may be based on one or more characteristics of the ambiguous temporal term determined by temporal term engine 122. For example, in some implementations the additional content determined may be based on the potential interpretations of the ambiguous temporal term. For example, when the multiple interpretations to be resolved are PM/AM, additional content engine 124 may determine additional content based on a first set of rules, whereas when the multiple interpretations to be resolved are different time zones, additional content engine 124 may determine additional content based on a second set of rules. Also, for example, where the multiple interpretations to be resolved are multiple potential dates, additional content engine 124 may determine additional content based on a third set of rules.

In some implementations where the resource is a message, other term(s) and/or metadata of related messages may be utilized. Related messages of a message may include, for example, messages that are in the same thread (e.g., replies) as the message and/or messages that are otherwise determined to be related to the message. In some implementations, client device 105 and/or messaging system 130 may provide an indication of related messages to the ambiguity resolution system 120. In some implementations, ambiguity resolution system may determine related messages. In some implementations, ambiguity resolution system 120, client device 105, and/or messaging system may determine other messages that are related to a given message (but not in the same thread) based on, for example: temporal proximity of the other messages to the given message; similarity between the subject of the other messages and the given message; similarity between the non-subject content of the other messages and the given message; and/or similarity between the parties (e.g., recipient(s) and/or sender(s)) of the other messages and the given message. In some implementations, the message and the related message may be distinct types. For example, the message may be a message of a first type such as one of an email type, a text message type, and a social networking message type, and the related message may be of a second type such as another of an email type, a text message type, and a social networking message type. Also, for example, the message may be of an email type and the related message may be an attachment sent with the message that is of a distinct type (e.g., a word processing document, a PDF document).

In some implementations, temporal term engine 124 and/or additional content engine 124 may ignore certain content in making one or more determinations. For example, in some implementations certain content may be ignored based on one or more rules. For instance, temporal term engine 124 and/or additional content engine 124 may ignore attribution lines of messages such as an attribution line of "On July 25, John Doe wrote:"

Generally, resolution engine 126 resolves multiple interpretations of an ambiguous temporal term (determined by temporal term engine 122) to a subset based on the additional content (determined by additional content engine 124). In some implementations, resolution engine 126 resolves the multiple interpretations based on one or more associations of the additional content to the subset. For example, the ambiguous temporal term may be "7:00" and the additional content may be a reference to a non-temporal entity such as "dinner". Based on "dinner" being associated with a "PM" activity, the ambiguous temporal term may be resolved to be associated with "PM." As yet another example, the ambiguous temporal term may be "7:00" and the additional content may be a sender of the message associated with the ambiguous temporal term. Based on the sender being associated with a time zone and/or a time period (PM/AM), the ambiguous temporal term may be associated with the time zone and/or time period. For instance, data of the user to which the message was sent may indicate that past interactions of the user with the sender typically occur in the PM time period—and the sender may be associated with the PM time period based on such data. As yet another example, the ambiguous temporal term may be 7:00 and the additional content may be a reference to a non-temporal entity such as "Pat's Steakhouse". Based on data that indicates "Pat's Steakhouse" is only open in the evenings (or that indicates entities of the category "steakhouse" are most strongly associated with PM times), the ambiguous temporal term may be resolved to be associated with "PM."

In some implementations, the resolution engine 126 may utilize one or more databases to determine an association of additional content to a subset of multiple interpretations of an ambiguous temporal term. For example, as illustrated in FIG. 1, ambiguity resolution system 120 may be in communication with a contacts database 152, an entity database 154, and a features database 156 (described in more detail below) that may be utilized to determine an association of additional content to a subset of multiple interpretations. Also, for example, ambiguity resolution system 120 may be in communication with one or more databases maintained locally on client device 105, such as databases maintained by calendar application 107, messages application 108, and/or contacts application 109. Such databases may likewise be utilized to determine an association of additional content to a subset of multiple interpretations.

In some implementations, the resolution engine 126 may resolve the multiple interpretations of an ambiguous term based on regular expressions or other rules, heuristics, etc. For example, the resolution engine 126 may apply a rule that disambiguates an ambiguous time term that does not indicate a time period of AM or PM based on which of AM and PM is most strongly associated with additional content identified by additional content engine 124. In some implementations, the resolution engine 126 may include, or be in communication with, at least one system trained based on training data and the system may be utilized to resolve the multiple interpretations of an ambiguous term. For example, the system may be a machine-learning system trained to receive, as input, one or more features associated with the ambiguous temporal term and the additional content, and provide, as output, an indication of a subset of the multiple interpretations of an ambiguous term. For instance, the machine-learning system may be a classifier trained to provide, as output, an indication of whether an ambiguous time term is associated with a time period of AM and PM and/or an indication of which of a plurality of time zones an ambiguous time term is associated. In some implementations, multiple systems may optionally be provided, with each trained to resolve a unique set of multiple interpretations. For example, a first classifier may resolve whether an ambiguous time term is associated with a time period of AM and PM, a second classifier may resolve which of a plurality of time zones an ambiguous time term is associated with, and a third classifier may resolve which of a plurality of dates an ambiguous date term is associated. The ambiguity resolution system 120 may select an appropriate system based on one or more characteristics of the ambiguous temporal term. For example, the ambiguity resolution system 120 may select a classifier configured to resolve multiple of the interpretations of the ambiguous temporal term.

In some implementations, resolution engine 126 resolves multiple interpretations of an ambiguous temporal term to a subset that includes only a single interpretation. In some implementations, resolution engine 126 resolves the multiple interpretations to a subset that includes multiple interpretations. In some versions of those implementations, the resolution engine 126 may optionally rank the multiple interpretations of the subset relative to one another. For example, a score for each interpretation of the multiple interpretations of the subset may be calculated based on, for example, a quantity of additional content that is associated with the interpretation, a strength of association of the associated additional content to the interpretation, heuristics, and/or other factors. The multiple interpretations may then be ranked based on their scores. Additional description of ambiguity resolution system 120 is provided herein (e.g., with respect to FIGS. 2-6).

Generally, contacts database 152 may include one or more contact collections of a user, with each of the contact collections including one or more contact entries. A contact entry includes information identifying a set of one or more properties of an entity. For example, a contact entry of a user for an individual may include one or more aliases, phone numbers, email addresses, addresses, time(s) associated with past interactions of the user with the individual, date(s) associated with past interactions of the user with the individual, location(s) associated with past interactions of the user with the individual, and/or other properties associated with the individual. Past interactions of a user with an individual may include, for example, past calls between the user and individual, past messages between the user and individual, and/or past indications of physical co-presence of the user and individual (e.g., based on event data, location data). In some implementations, user contacts stored locally on the client device 105 by contacts application 109 and contacts database 152 may include one or more of the same contact entries and/or may contain one or more different contact entries. For example, the user contacts of client device 105 may be synched to the contacts database 152 on a periodic or other basis. In some implementations, resolution engine 126 may utilize contacts database 152 to determine an association of additional content to a subset of multiple interpretations of an ambiguous temporal term. For example, resolution engine 126 may determine, based on contacts database 152, that a contact of a sender of a message in which an ambiguous term is present is associated with a certain time zone (e.g., based on one or more addresses for the contact, based on an area code of a phone number for the contact, and/or based on a county telephone code of a phone number for the contact), is most strongly associated with a certain time period for interactions with the user, and/or is most strongly associated with certain dates for interactions with the user. In some implementations, contacts database 152, may include information items of a plurality of users and access to information items of a user in database may be allowed for only the user and/or one or more other users or components authorized by the user such as ambiguity resolution system 120.

Generally, entity database 154 may include a collection of entities and may include, for each of one or more of the entities, a mapping to one or more properties associated with the entity and/or one or more entities related to the entity. For example, the entity database 154 may be a knowledge graph, such as a local knowledge graph that includes entities associated with businesses and includes properties for each of the entities such as phone numbers, addresses, open hours, most popular hours, etc. In some implementations, entity database 154 may be utilized by ambiguity resolution system 120 and/or annotator 102 to determine a reference to an entity in a resource. In some implementations, resolution engine 126 may utilize entity database 154 to determine an association of additional content to a subset of multiple interpretations of an ambiguous temporal term. For example, resolution engine 126 may determine an entity is most strongly associated with a certain time period based on open hours and/or most popular hours of the entity as indicated by properties of that entity in entity database 154.

Generally, features database 156 may include, for each of a plurality of features, an association of the feature to one or more interpretations of an ambiguous term and, optionally, a measure for each interpretation that indicates strength of the association of the feature to the interpretation. For example, features database 156 may include a first feature that indicates an email is sent within X days of the next upcoming day of the week referenced by an ambiguous temporal term of "next [day of the week]" in the email. The first feature may be associated with a first interpretation of the nearest in future [day of the week] and a measure for that interpretation. The first feature may also be associated with a second interpretation of that same [day of the week] following the nearest in future [day of the week] and a measure for that interpretation. In some implementations, ambiguity resolution system 120 may select the first interpretation or the second interpretation based at least in part on the measures of the first and second features. As another example, features database 156 may include another feature that indicates an email is sent by an individual in a first geographic region more than X days of the next upcoming day of the week referenced by an ambiguous temporal term of "next [day of the week]" in the email. The additional feature may be associated with only a single interpretation of the nearest in future [day of the week]. In some implementations, the features, interpretations, and optional measures of features database 156 may be based on heuristics that indicate past user input related to the interpretations given the features.

In this specification, the term "database" will be used broadly to refer to any collection of data. The data of the database does not need to be structured in any particular way, or structured at all, and it can be stored on storage devices in one or more locations. Thus, for example, the databases 152, 154, and/or 156 may each include multiple collections of data, each of which may be organized and accessed differently. Also, for example, all or portions of the databases 152, 154, and/or 156 may be combined into one database and/or may contain pointers and/or other links between entries in the database(s). Also, in this specification, the term "entry" will be used broadly to refer to any mapping of a plurality of associated information items. A single entry need not be present in a single storage device and may include pointers or other indications of information items that may be present on other storage devices. For example, an entry may include multiple nodes mapped to one another, with each node including an identifier of an entity or other information item that may be present in another data structure and/or another storage medium.

Generally, messaging system 130 may maintain messages database 158 of correspondence between various users that may be available, in whole or in selective part, to ambiguity resolution system 120. For instance, messaging system 130 may include an email server, such as a simple mail transfer protocol ("SMTP") server that operates to permit users to exchange email messages. Also, for instance, messaging system 130 may include a social network messaging system, that operates to permit users to exchange private messages, post public messages, etc. In some implementations, messaging system 130 may provide all or parts of a message to ambiguity resolution system 120 as it is received and/or as it is accessed by the user for analysis by ambiguity resolution system 120. In some implementations, messages stored locally on the client device 105 by messages application 108 and messages database 158 may include one or more of the same messages and/or may contain one or more different messages. In some implementations, messages database 158, may include messages of a plurality of users and access to messages of a user in messages database 158 may be allowed for only the user and/or one or more other users or components authorized by the user such as ambiguity resolution system 120.

Generally, scheduling system 140 may utilize a subset of the multiple interpretations of an ambiguous temporal term to create, and/or facilitate creation of, a calendar or other scheduling entry that includes the subset and optionally other associated content. For example, the scheduling system 140 may create a calendar entry for the user that includes the subset and presents the user with the option to supply other information for the calendar entry. Also, for example, the scheduling system 140 may provide the client device 105 a notification that queries the user as to whether the user wishes to create a calendar entry with the subset. Also, for example, the scheduling system 140 may create a calendar entry for the user that includes the subset and other content determined to be relevant to an event, task etc. For example, for an email that includes the sentence "Bob's birthday dinner at Pat's Steakhouse—6/26/14 at 7:00."—the scheduling system 140 may create a calendar entry that includes a time of "7:00 PM" (as determined by the ambiguity resolution system 120) and other content such as a location of "Pat's Steakhouse", an event name of "Bob's birthday dinner", and a date of "6/26/14". The scheduling system 140 may utilize one or more techniques to determine the other content. In some implementations, the scheduling system 140 may interface with calendar application 107, browser 106, and/or other component of client device 105 in creating a calendar entry. In some implementations, the scheduling system 140 may be incorporated, in whole or in part, on the client device 105.

In some implementations, the scheduling system 140 may provide an indication of the subset by presenting content related to the subset in combination with the ambiguous temporal term in the message. For example, in some implementations the scheduling system 140 may interface and/or be incorporated with the messaging system 130 and/or another component (e.g., messages application 108 or a component of browser 106) and incorporate, in a message that includes the ambiguous term, text or other content that identifies the subset. For example, for an email that includes the sentence "Bob's birthday dinner at Pat's Steakhouse— 6/26/14 at 7:00."—the scheduling system 140 may alter the email to read "Bob's birthday dinner at Pat's Steakhouse— 6/26/14 at 7:00 [PM]." Various techniques may optionally be utilized to indicate the "PM" was not part of the original text such as brackets shown in the preceding example, highlighting, underlining, and/or other graphical demarcation. Also, for example, the scheduling system 140 may incorporate java script or other code in the message that causes "PM" to be displayed (e.g., in a pop-up window) when the user "hovers" over or otherwise selects 7:00. Additional and/or alternative techniques may be utilized to provide an indication of the subset to the user via a computing device and/or to create a calendar or other scheduling entry that includes the subset.

Generally, the annotator 102 may be configured to identify and annotate various types of grammatical information in one or more text segments of a resource. For example, the annotator 102 may include a part of speech tagger configured to annotate terms in one or more segments with their grammatical roles. For example, the part of speech tagger may tag each term with its part of speech such as "noun," "verb," "adjective," "pronoun," etc. Also, for example, annotator 102 may additionally and/or alternatively include a dependency parser configured to determine syntactic relationships between terms in one or more segments. For example, the dependency parser may determine which terms modify other terms, subjects and verbs of sentences, and so forth (e.g., a parse tree)—and may make annotations of such dependencies. Also, for example, annotator 102 may additionally and/or alternatively include an entity tagger configured to annotate entity references in one or more segments such as references to people, organizations, locations, and so forth. For example, the entity tagger may annotate all references to a location in one or more segments of a document. The entity tagger may annotate references to an entity at a high level of granularity (e.g., to enable identification of all references to an entity category such as "Steak Restaurants", "Coffee Shops", "Bars", etc) and/or a lower level of granularity (e.g., to enable identification of all references to a particular entity such as a particular restaurant, store, etc.). The entity tagger may rely on content of the resource to resolve a particular entity and/or may optionally communicate with entity database 154 to resolve a particular entity. Also, for example, in some implementations the annotator 102 may additionally and/or alternatively include a coreference resolver configured to group, or "cluster," references to the same entity based on one or more contextual cues.

While depicted as separate components in FIG. 1, in various implementations, all or part of annotator 102, ambiguity resolution system 120, messaging system 130 and/or scheduling system 140 may be combined and/or implemented on client device 105. Also, in some implementations annotator 102, messaging system 130 and/or scheduling system 140 may be omitted.

Figure 2:
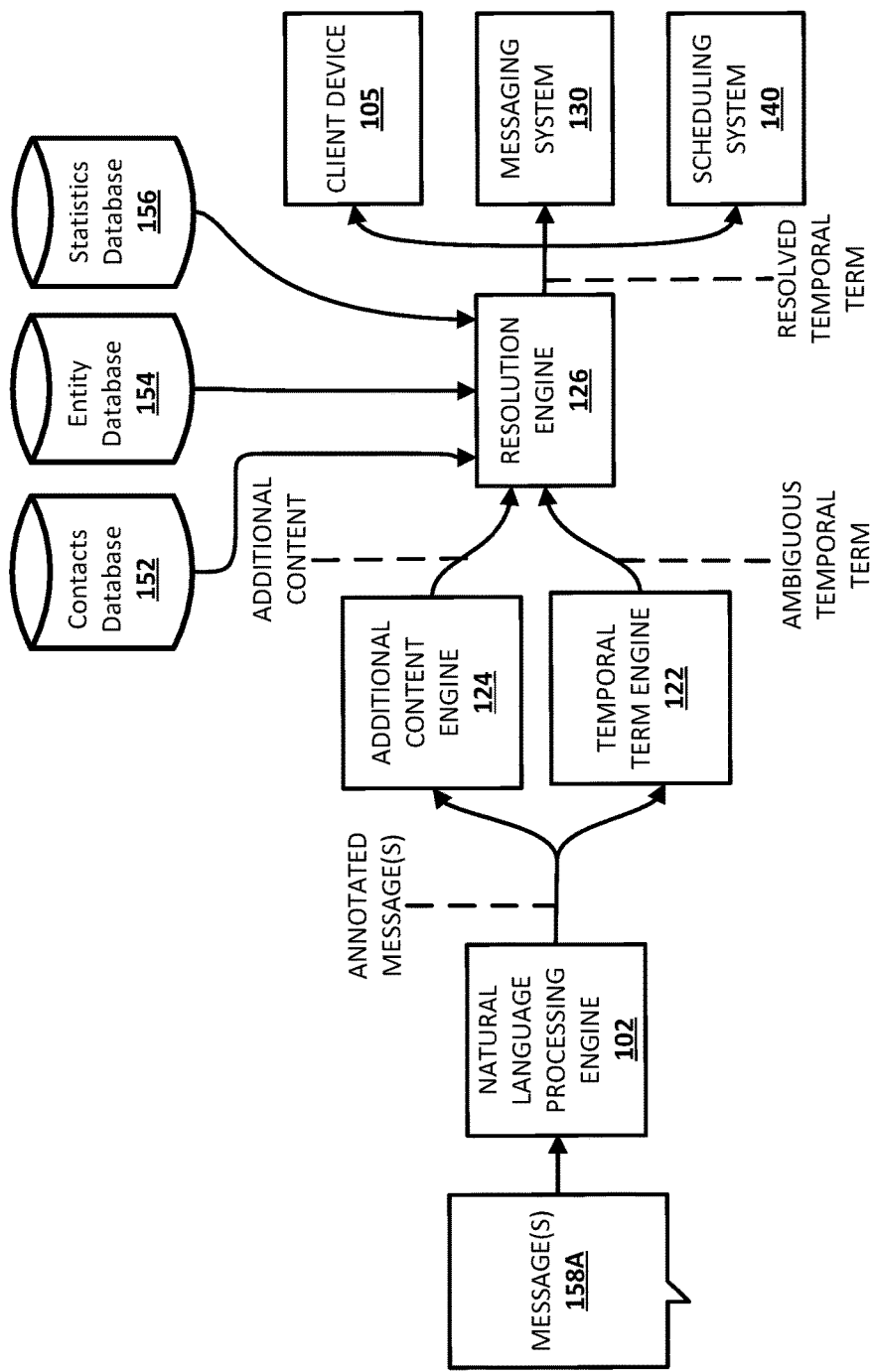
FIG. 2 illustrates an example of how multiple interpretations of an ambiguous temporal term of a resource may be resolved to a subset of the multiple interpretations.

FIG. 2 schematically depicts one example of how multiple interpretations of an ambiguous temporal term of a resource may be resolved to a subset of the multiple interpretations based on the present disclosure. One or more messages 158A from messages database 158 are received by annotator 102. Annotator 102 annotates various types of grammatical information in one or more text segments of the messages 158A and provides the annotated message(s) to temporal term engine 122 and additional content engine 124. Temporal term engine 122 determines an ambiguous temporal term in the annotated message(s) and provides the ambiguous temporal term to the resolution engine 126. In some implementations, the temporal term engine 122 may determine an ambiguous temporal term based on regular expressions or other rules and may optionally utilize one or more of the annotations of the annotated message(s). Additional content engine 124 determines additional content in the annotated message(s) that may be utilized to resolve multiple interpretations of the ambiguous terms. In some implementations, the additional content engine 124 may determine the additional content based on regular expressions or other rules and may optionally utilize one or more of the annotations of the annotated message(s). In some implementations, the additional content determined by additional content engine 124 may be based on one or more characteristics of the ambiguous temporal term determined by temporal term engine 122. In some implementations, the ambiguous temporal term may be determined from a first message of the annotated message(s) and the additional content may be determined from one or more related messages of the annotated message(s).

Resolution engine 126 resolves multiple interpretations of the ambiguous temporal term to a subset based on the additional content. In some implementations, resolution engine 126 resolves the multiple interpretations based on one or more associations of the additional content to the subset. In some of those implementations, the resolution engine 126 may utilize one or more of databases 152, 154, 156, and/or other database (e.g., local to client device 105) to determine an association of additional content to a subset of multiple interpretations of an ambiguous temporal term. The resolution engine 126 provides an indication of the resolved temporal term to one or more of the client device 105, the messaging system 130, and the scheduling system 140. The resolved indication of the resolved temporal term may be utilized by one or more of components 105, 130, and 140 to, for example, provide an indication of the subset to the user via the client device 105 and/or to create a calendar or other scheduling entry that includes the subset and other associated content.

Referring now to FIGS. 3-5, additional examples of how multiple interpretations of an ambiguous temporal term of a resource may be resolved to a subset of the multiple interpretations are described.

FIG. 3 illustrates an example text message 108A that includes the sentence 108A1 "We're having dinner at Pat's Steakhouse on Jun. 26, 2014 at 7:00". All or portions of the text message 108A may be provided to the ambiguity resolution system 120 by the messages application 108 of client device 105 and/or another component (e.g., messaging system 130, annotator 102). Temporal term engine 122 may determine "7:00" is an ambiguous temporal term based on, for example, a rule that identifies any term of the format "[0-12]:00" that is not followed within a threshold distance by "AM, am, PM, pm, A.M., a.m., P.M., or p.m." and/or one or more indications of time zone (e.g., EST, Eastern, eastern).

Additional content engine 124 may determine additional content to resolve the multiple interpretations of "7:00". For example, additional content engine 124 may identify "Pat's Steakhouse" as additional content based on application of a rule that identifies any tagged entities in the same sentence of the ambiguous temporal term, within a threshold distance of the ambiguous temporal term, and/or with some syntactic relationship with the ambiguous temporal term as additional content. Additional content engine 124 may optionally rely on output from annotator 102 in applying such a rule. Also, for example, additional content engine 124 may identify contact information of the sender of the text message (e.g., "Bob" and/or "(123)456-7891")) as additional content based on application of a rule that identifies senders of the message. In some implementations, the rule(s) utilized by the additional content engine 124 may be selected based on the ambiguous temporal term. For example, the rule(s) may be associated with an ambiguous temporal term that is open to multiple time period and/or time zone interpretations and may be configured to identify additional content that is potentially relevant to disambiguating the multiple time period and/or time zone interpretations.

Resolution engine 126 resolves multiple interpretations of the ambiguous temporal term "7:00" to a subset based on the additional content. In some implementations, resolution engine 126 resolves the multiple interpretations based on one or more associations of the additional content to the subset. For example, resolution engine 126 may identify, in entity database 154, an association of the entity associated with "Pat's Steakhouse" to a "PM" time period and/or an association of a category of entities (e.g., "Steakhouses") associated with "Pat's Steakhouse" to a "PM" time period. Also, for example, resolution engine 126 may identify, in contacts database 152, an entry for the sender of the text message 108A that includes an indication that past user interactions with the sender most typically occur in the "PM" time period. Based on the association of the additional content to the "PM" time period, the resolution engine 126 may resolve the AM and PM interpretations of the ambiguous temporal term "7:00" to a PM interpretation. Additionally or alternatively, the resolution engine 126 may identify, in entity database 154, an association of the entity associated with "Pat's Steakhouse" to a location associated with the "Eastern Time Zone". Also, for example, resolution engine 126 may identify, in contacts database 152, an entry for the sender of the text message 108A that includes an indication that past user interactions with the sender most typically occur in the "Eastern Time Zone" and/or that the sender is associated with an address in the "Eastern Time Zone". Based on the association of the additional content to the "Eastern Time Zone", the resolution engine 126 may resolve the multiple time zone interpretations of the ambiguous temporal term "7:00" to an "Eastern Time Zone". In some implementations where multiple pieces of additional content conflict, the resolution engine 120 may not resolve the ambiguous term, or may apply one or more rules to select one of the conflicting interpretations. For example, if "Pat's Steakhouse" is associated with a "PM" time period, but interactions with the sender are associated with both an "AM" and a "PM" time period, the resolution engine 120 may apply priority rules to select one of the interpretations. For example, the resolution engine 120 may choose the "PM" time period based on a measure indicative of a relatively strong association of "Pat's Steakhouse" to that time period and a measure indicative of a relatively weak association of interactions of the sender with the "AM" time period. The resolution of the ambiguous temporal term "7:00" to "7:00 PM Eastern" may be utilized for various purposes such as those described herein. For example, the resolution may be provided to the client device and the text message 108A may be modified to read "We're having dinner at Pat's Steakhouse on Jun. 26, 2014 at 7:00 [PM Eastern]."

FIG. 4 illustrates an example email message trail 158B that includes a more recent email 158B1 and an earlier related email 158B2. Email 158B1 includes the sentence "10:00 next Tuesday is a good time for us". All or portions of the email 158B1 may be provided to the ambiguity resolution system 120 by the messaging system 130 and/or another component (e.g., annotator 102). Temporal term engine 122 may determine "10:00" is an ambiguous temporal term based on, for example, a rule that identifies any term of the format "[0-12]:00" that is not followed within a threshold distance by "AM, am, PM, pm, A.M., a.m., P.M., or p.m." and/or one or more indications of time zone (e.g., EST, Eastern, eastern). Temporal term engine 122 may also determine "next Tuesday" is an ambiguous temporal term based on, for example, a regular expression such as: (Next-|next) \s* (Sunday|sunday|Monday|monday . . . . Saturday-|saturday).

Additional content engine 124 may determine additional content to resolve the multiple interpretations of "10:00" and "next Tuesday". For example, additional content engine 124 may identify "morning" as additional content based on application of a rule that identifies any terms in the body of related messages that may be indicative of an AM or PM time period, when the body of a message in which an ambiguous temporal term occurs fails to include any terms that indicate an AM or PM time period. Additional content engine 124 may optionally rely on output from annotator 102 in applying such a rule. Also, for example, additional content engine 124 may identify a date the email 158B1 was sent (e.g., "Monday" and/or "Jan. 10, 1985")) as additional content based on application of a rule that identifies a date a message was sent when an ambiguous temporal term of the message is of the form "next [day of the week]".

Resolution engine 126 resolves multiple interpretations of the ambiguous temporal term "10:00" to a subset based on the additional content. In some implementations, resolution engine 126 resolves the multiple interpretations based on one or more associations of the additional content to the subset. For example, resolution engine 126 may identify an association of the term "morning" to an "AM" time period (e.g., in a rule and/or a database such as entity database 154). Based on the association of the additional content to the "AM" time period, the resolution engine 126 may resolve the AM and PM interpretations of the ambiguous temporal term "10:00" to an AM interpretation. Additionally or alternatively, the resolution engine 126 may determine the email 158B1 was sent one day (Monday) before the day of the week (Tuesday) present in the ambiguous temporal term "next Tuesday". The time resolution engine 126 may further identify, in features database 156, a first feature that indicates an email is sent within 1 day of the next upcoming day of the week referenced by an ambiguous temporal term of "next [day of the week]", an association of the first feature with an interpretation of the [day of the week] following the closest in time [day of the week], and a measure for that interpretation that indicates a very strong association of the first feature to that interpretation. Based on the association of the additional content to the [day of the week] following the closest in time [day of the week], the resolution engine 126 may resolve the multiple "next Tuesday" interpretations to "Tuesday, Jan. 15, 1985". Although a particular first feature is described in this example, additional and/or alternative features may be utilized. For example, the feature may additionally and/or alternatively indicate the day of the week the email was sent, the day of the week referenced in the "next [day of the week]", a geographic region of the sender, etc. The resolution of the ambiguous temporal terms may be utilized for various purposes such as those described herein. For example, the scheduling system may create a calendar entry for 10:00 AM on Tuesday, Jan. 15, 1985.

FIG. 5 illustrates an example text message 108B that include an ambiguous temporal term and that is related to the example email message trail 158B of FIG. 4. In some implementations, ambiguity resolution system 120, client device 105, and/or messaging system 130 may determine text message 108B is related to emails 158B1 and/or 158B2 based on, for example: temporal proximity of the other messages to the given message (e.g., how close in time/date the messages are to one another); similarity between content of the other messages and the given message (e.g., both include "teleconference"); and/or similarity between the parties (e.g., both include "Jim", "Joe", and "Bob").

Temporal term engine 122 may determine "11:00" is an ambiguous temporal term based on, for example, one or more techniques described herein. Additional content engine 124 may determine additional content to resolve the multiple interpretations of "11:00". For example, additional content engine 124 may identify "morning" in related message 158B2 as additional content based on application of a rule that identifies any terms in the body of related messages that may be indicative of an AM or PM time period, when the body of a message in which an ambiguous temporal term occurs fails to include any terms that indicate an AM or PM time period. Also, for example, additional content engine 124 may optionally identify the previous resolution of "10:00" in email 158B1 to "AM" as additional content. Resolution engine 126 resolves multiple interpretations of the ambiguous temporal term "11:00" to a subset based on the additional content. In some implementations, resolution engine 126 resolves the multiple interpretations based on one or more associations of the additional content to the subset. For example, resolution engine 126 may identify an association of the term "morning" to an "AM" time period (e.g., in a rule and/or a database such as entity database 154). Based on the association of the additional content to the "AM" time period, the resolution engine 126 may resolve the AM and PM interpretations of the ambiguous temporal term "11:00" to an AM interpretation.

Specific examples are provided with respect to FIGS. 3-5 and in other description herein. However, the description herein may be utilized in additional and/or alternative examples to resolve an ambiguous temporal term. As one example, a message may include the sentence "How about 7:00?". Temporal term engine 122 may determine "7:00" is an ambiguous temporal term based on techniques described herein. Additional content engine 124 may determine additional content to resolve the multiple interpretations of "7:00". For example, additional content engine 124 may identify an earlier reference to a temporal term that includes an indication of "PM" or "AM". For instance, additional content engine may identify a reference to "6:00 PM" in a related message. Resolution engine 126 may resolve multiple interpretations of the ambiguous temporal term "7:00" to a subset based on the additional content "6:00 PM". For example, resolution engine 126 may resolve the ambiguous temporal term to "7:00 PM" based on the association of the additional content to "PM".

As another example, a message may include the sentence "Let's meet at 11:00.". Temporal term engine 122 may determine "11:00" is an ambiguous temporal term based on techniques described herein. Additional content engine 124 may determine additional content to resolve the multiple interpretations of "11". For example, additional content engine 124 may determine a reference to one or more non-temporal entities in the message that may be associated with a subset of the multiple interpretations, such as a reference to "lunch", which may be associated with a subset of an "AM" time period for certain ambiguous temporal terms such as "11", "11:30", "11:45" and associated with a subset of a "PM" time period for other ambiguous temporal terms such as "12", "12:00", "1:00". Resolution engine 126 may resolve multiple interpretations of the ambiguous temporal term "11" to a subset based on the additional content "lunch". For example, resolution engine 126 may resolve the ambiguous temporal term to "11:00 AM" based on the association of "dinner" to "AM" for certain ambiguous temporal terms such as "11:00".

As yet another example, an email may include the term "06-10-2014". Temporal term engine 122 may determine "06-10-2014" is an ambiguous temporal term based on techniques described herein (e.g., either Jun. 10, 2014 or Oct. 6, 2014). Additional content engine 124 may determine additional content to resolve the multiple interpretations of "06-10-2014". For example, additional content engine 124 may determine a language of the email (e.g., based on analysis of the text and/or based on metadata), and/or a country code top-level domain name of a sender of the email that are associated with a subset of the multiple interpretations. For example, a country code top-level domain name of ".uk" may be associated with a subset of a date format of "day-month-year". Resolution engine 126 may resolve multiple interpretations of the ambiguous temporal term "06-10-2014" to "Oct. 6, 2014" based on the association.

As yet another example, a message may include the sentence "How about 8 pm". Temporal term engine 122 may determine "8 pm" is an ambiguous temporal term based on techniques described herein (e.g., "8 pm" may be referencing 8 pm today, tomorrow, etc.). Additional content engine 124 may determine additional content to resolve the multiple interpretations of "8 pm". For example, additional content engine 124 may determine presence in the message of a term that may be associated with a subset of the multiple interpretations, such as a reference to "tomorrow", which may be associated with the nearest in future date. Resolution engine 126 may resolve multiple interpretations of the ambiguous temporal term "8 pm" to "8 PM tomorrow" based on the additional content "tomorrow".

Figure 6:
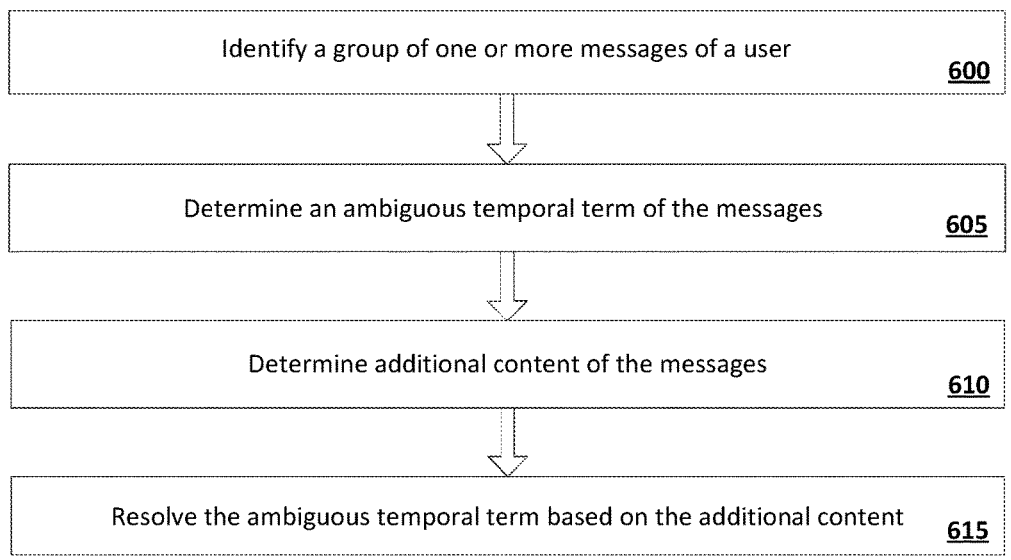
FIG. 6 is a flow chart illustrating an example method of resolving multiple interpretations of an ambiguous temporal term of a resource to a subset of the multiple interpretations.

FIG. 6 is a flow chart illustrating an example method of resolving multiple interpretations of an ambiguous temporal term of a resource to a subset of the multiple interpretations. For convenience, the operations of the flow chart are described with reference to a system that performs the operations. This system may include various components of various computer systems. For instance, some operations may be performed by one or more components of the ambiguity resolution system 120 such as temporal term engine 122, additional content engine 124, and resolution engine 126. Moreover, while operations of the method of FIG. 6 are shown in a particular order, this is not meant to be limiting. One or more operations may be reordered, omitted or added.

At step 600, the system identifies a group of one or more messages of a user. For example, the system may receive all or aspects of one or more messages from messaging system 130, client device 105, and/or annotator 102. In some implementations, a single message is included in the group. In some implementations, the group of messages may include a plurality of related messages. In some implementations, the system may determine a plurality of related messages based on temporal proximity of the messages, similar content of the messages, similar parties included in the messages, and/or other factors.

At step 605, the system determines an ambiguous temporal term of the messages of the identified group. In some implementations, the system may determine an ambiguous temporal term based on regular expressions or other rules and may optionally utilize one or more annotations provided by annotator 102.

At step 610, the system determines additional content of the messages. The additional content may be utilized to resolve multiple interpretations of the ambiguous term determined at step 605. In some implementations, the system may determine the additional content based on regular expressions or other rules and may optionally utilize one or more of the annotations provided by the annotator 102. In some implementations, determining the additional content may be based on one or more characteristics of the ambiguous temporal term determined at step 605. In some implementations, the ambiguous temporal term may be determined from a first message of the group of messages and the additional content may be determined from one or more related messages of the group of messages.

At step 615, the system resolves the ambiguous temporal term based on the additional content. In some implementations, the system resolves the multiple interpretations of the ambiguous term based on one or more associations of the additional content to the subset. In some of those implementations, the system may utilize one or more of databases 152, 154, 156, and/or other database (e.g., local to client device 105) to determine an association of additional content to a subset of multiple interpretations of an ambiguous temporal term. The system may optionally provide an indication of the resolved temporal term to one or more components such as the client device 105, the messaging system 130, and the scheduling system 140. The resolved indication of the resolved temporal term may be utilized by one or more of the components to, for example, provide an indication of the subset to the user via the client device 105 and/or to create a calendar or other scheduling entry that includes the subset and other associated content. In some implementations, the steps of FIG. 6 may be performed only on messages having certain characteristics. For example, in some implementations the steps of FIG. 6 may only be performed when it is first determined the messages are sent from one or more top-level domains and/or not sent from one or more other top-level domains.

Figure 7:
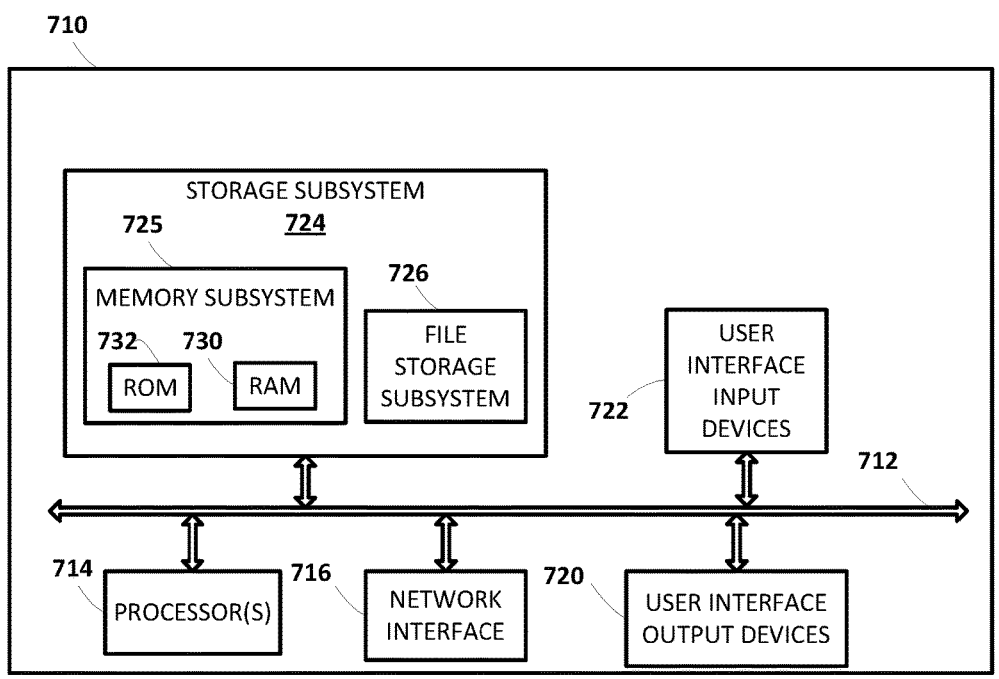
FIG. 7 illustrates an example architecture of a computer system.

FIG. 7 is a block diagram of an example computer system 710. Computer system 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computer system 710. Network interface subsystem 716 provides an interface to outside networks and is coupled to corresponding interface devices in other computer systems.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 710 to the user or to another machine or computer system.

Storage subsystem 724 stores programming and data constructs that provide the functionality of some or all of the modules described herein. For example, the storage subsystem 724 may include the logic to perform selected aspects of the method of FIG. 6, as well as one or more of the operations performed by temporal term engine 122, additional content engine 124, resolution engine 126 and so forth.

These software modules are generally executed by processor 717 alone or in combination with other processors. Memory 725 used in the storage subsystem can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 727, or in other machines accessible by the processor(s) 717.

Bus subsystem 712 provides a mechanism for letting the various components and subsystems of computer system 710 communicate with each other as intended. Although bus subsystem 712 is shown schematically as a single bus, alternative implementations of the bus subsystem may use multiple busses.

Computer system 710 can be of varying types including a workstation, server, computing cluster, blade server, server farm, or any other data processing system or computing device. Due to the ever-changing nature of computers and networks, the description of computer system 710 depicted in FIG. 7 is intended only as a specific example for purposes of illustrating some implementations. Many other configurations of computer system 710 are possible having more or fewer components than the computer system depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system, comprising:
at least one network interface;
memory storing instructions; and
one or more processors executing the instructions stored in the memory to cause the one or more processors to:
receive, via the at least one network interface, a first electronic message generated by a user via a client device;
identify, based on the first electronic message, one or more first message terms of the first electronic message;
receive, via the at least one network interface, a second electronic message generated by the user via the client device, the second electronic message being generated subsequent to the first electronic message;
identify, based on the second electronic message, one or more second message terms of the second electronic message;
determine an ambiguous temporal term of the second terms of the second electronic message, the ambiguous temporal term open to multiple interpretations of dates and/or times;
determine a non-temporal term of the first terms of the first electronic message, the non-temporal term in addition to the ambiguous temporal term;
resolve, based on the non-temporal term, the multiple interpretations, of the ambiguous temporal term, to a subset, wherein in resolving the multiple interpretations to the subset one or more of the processors are to:
determine the subset based on an association of the non-temporal term to the subset; and
responsive to receiving the second electronic message:
transmit, to the client device via the at least one network interface, content that causes the client device to present the resolved subset.

2. The system of claim 1, wherein one or more of the processors, in executing the instructions, are further to, responsive to receiving the second electronic message:
automatically create an electronic calendar entry that includes the resolved subset.

3. The system of claim 2, wherein the ambiguous temporal term is a time that fails to identify whether it is for an AM time period or a PM time period, the multiple interpretations include the AM time period and the PM time period, and wherein the resolved subset is one of the AM time period and the PM time period.

4. The system of claim 1, wherein the association of the non-temporal term to the subset is at least one of: an association to a time zone, an association to a time period, an association to one or more dates, an association to a location, and an association to a language.

5. The system of claim 1, wherein the non-temporal term is a reference to a location.

6. The system of claim 1, wherein in resolving the multiple interpretations to the subset based on the non-temporal term one or more of the processors are to provide one or more features associated with the ambiguous temporal term and the non-temporal term as input to a trained machine-learning system and receive, as output from the trained machine-learning system, an indication of the subset.

7. The system of claim 1, wherein the first message is of a first type and the second message is of a second type that is distinct from the first type.

8. A method implemented by one or more processors, the method comprising:
- receiving a first electronic message generated by a user via a client device;
- identifying, based on the first electronic message, one or more first message terms of the first electronic message;
- receiving a second electronic message generated by the user via the client device, the second electronic message being generated subsequent to the first electronic message;
- identifying, based on the second electronic message, one or more second message terms of the second electronic message;
- determining an ambiguous temporal term of the second terms of the second electronic message, the ambiguous temporal term open to multiple interpretations of dates and/or times;
- determining a non-temporal term of the first terms of the first electronic message, the non-temporal term in addition to the ambiguous temporal term;
- resolving, based on the non-temporal term, the multiple interpretations, of the ambiguous temporal term, to a subset, wherein resolving the multiple interpretations to the subset includes:
  - determining the subset based on an association of the non-temporal term to the subset; and
- responsive to receiving the second electronic message:
  - causing the client device to present the resolved subset.

9. The method of claim 8, further comprising, responsive to receiving the second electronic message:
- automatically creating an electronic calendar entry that includes the resolved subset.

10. The method of claim 9, wherein the ambiguous temporal term is a time that fails to identify whether it is for an AM time period or a PM time period, the multiple interpretations include the AM time period and the PM time period, and wherein the resolved subset is one of the AM time period and the PM time period.

11. The method of claim 8, wherein the association of the non-temporal term to the subset is at least one of: an association to a time zone, an association to a time period, an association to one or more dates, an association to a location, and an association to a language.

12. The method of claim 8, wherein the non-temporal term is a reference to a location.

13. The method of claim 8, wherein resolving the multiple interpretations to the subset based on the non-temporal term includes providing one or more features associated with the ambiguous temporal term and the non-temporal term as input to a trained machine-learning system and receiving, as output from the trained machine-learning system, an indication of the subset.

14. The method of claim 8, wherein the first message is of a first type and the second message is of a second type that is distinct from the first type.

15. A non-transitory computer-readable medium comprising instructions that, in response to execution of the instructions by a computing device, cause the computing device to perform operations comprising:
- receiving a first electronic message generated by a user via a client device;
- identifying, based on the first electronic message, one or more first message terms of the first electronic message;
- receiving a second electronic message generated by the user via the client device, the second electronic message being generated subsequent to the first electronic message;
- identifying, based on the second electronic message, one or more second message terms of the second electronic message;
- determining an ambiguous temporal term of the second terms of the second electronic message, the ambiguous temporal term open to multiple interpretations of dates and/or times;
- determining a non-temporal term of the first terms of the first electronic message, the non-temporal term in addition to the ambiguous temporal term;
- resolving, based on the non-temporal term, the multiple interpretations, of the ambiguous temporal term, to a subset, wherein resolving the multiple interpretations to the subset includes:
  - determining the subset based on an association of the non-temporal term to the subset; and
- responsive to receiving the second electronic message:
  - causing the client device to present the resolved subset.

* * * * *